May 12, 1931.    J. H. VICTOR    1,804,574
GASKET
Filed Aug. 11, 1927
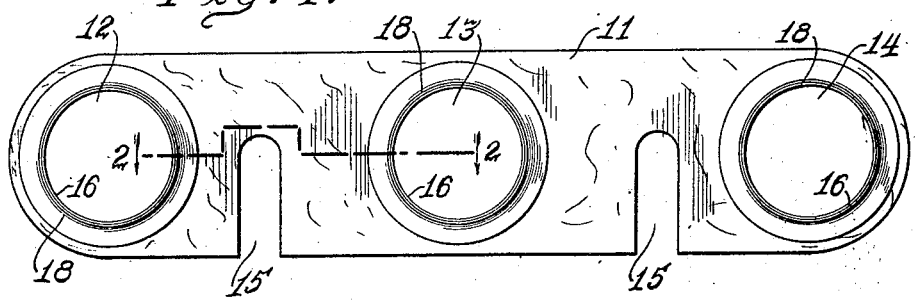
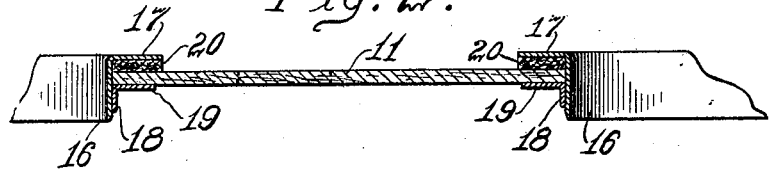
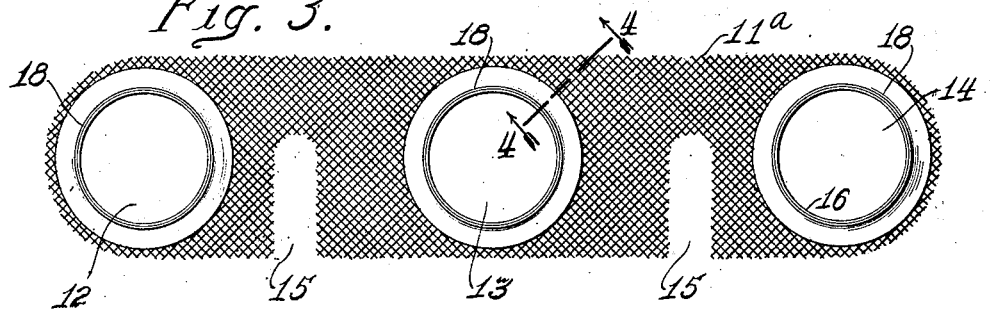
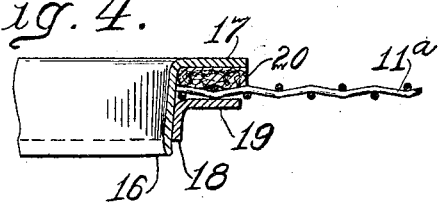
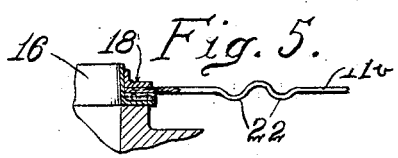
Inventor
John H. Victor
Daniel J. Brennan
Attorney.

Patented May 12, 1931

1,804,574

UNITED STATES PATENT OFFICE

JOHN H. VICTOR, OF CHICAGO, ILLINOIS, ASSIGNOR TO VICTOR MANUFACTURING & GASKET CO., A CORPORATION OF ILLINOIS

GASKET

Application filed August 11, 1927. Serial No. 212,205.

The invention relates broadly to gaskets and particularly to gaskets mounted in an adjustable holder.

An object of the invention is to provide a gasket holder adapted to carry a plurality of gaskets in longitudinal alignment, the holder being of such material that it will be automatically distorted upon inserting the gaskets in the openings or ports to bring said gaskets in registry with the openings when for any reason they do not readily exactly register.

Another object of the invention is to provide a holder for gaskets that may be either elongated, shortened or flexed to bring the gaskets mounted therein into a desired adjusted position.

In general the invention relates to a gasket holder carrying a plurality of gaskets in spaced relation, the holder being so constructed as to be readily distorted, stretched, or contracted to adjust the spaced arrangement of the gaskets to register with openings or ports where they are to be used.

With the foregoing and other objects in view which may appear as the description proceeds, the invention resides in the combination and arrangement of parts and in the details of construction hereinafter described and claimed, it being understood that changes in the precise embodiment herein described, may be made within the scope of what is claimed without departing from the spirit of the invention.

In the drawings:

Figure 1 is a plan view of a gasket holder made of flexible fibrous material, and supporting a plurality of gaskets in spaced relation.

Figure 2 is a fragmental longitudinal section taken on line 2—2 of Fig. 1.

Figure 3 is a view similar to Fig. 1, but disclosing a gasket holder made of screen.

Figure 4 is a fragmental section of one of the gaskets and the holder taken on line 4—4 of Fig. 3.

Figure 5 is a sectional view of a modified form of gasket shown in place over a port.

In providing gaskets for use around and in ports arranged and spaced from one another, such as the ports for an intake or exhaust manifold of a gas engine (not shown), it is necessary to have a holder to carry said gaskets in spaced relation arranged to register with said ports, or else the entire holder must be made to form a gasket covering the entire surface between the ports.

It sometimes happens however, that these gaskets carried by holders do not fit the openings for which they are intended, due to a number of causes. Therefore, it is necessary to bring them into registry with the openings. The holder of the present invention has been worked out to over-come this difficulty by so forming it as to be yieldable, thereby accomplishing said purpose.

As disclosed in Fig. 1, the holder 11 is made of fibrous material, such as a packing of the kind that is ordinarily used itself as a gasket and for other packing purposes.

Said holder is provided with openings 12, 13, and 14 arranged to receive gaskets to maintain them in longitudinal alignment with each other, and is also provided with slots 15 to provide for the holder's reception over the bolts in a cylinder block provided for securing the manifold thereto, between which block and manifold the gasket is used.

The gaskets as disclosed comprise an inner sleeve 16 having an external peripheral flange 17 formed integral therewith, said sleeve extending through an aperture in the holder, and an outer sleeve 18 having an external peripheral flange 19 extending therefrom, said sleeve 18 being of substantially the same internal diameter as the external diameter of sleeve 16, so that the two may be telescoped, leaving the flanges 17 and 19 disposed substantially horizontal and parallel with the fiber 11. A washer 20 of refractory material is placed between the flange 17 and the holder 11, in which position the gaskets will be held locked in place in the holder.

The unflanged end of the inner sleeve 16 is ordinarily turned over as shown in Fig. 4, so as to overlie the unflanged end of the sleeve 18, and thereby to hold the gasket parts in locked engagement with the holder and with each other. In other instances the sleeves 16 and 18 are tapered as shown in Fig. 4 so that when forced into telescoped engagement with each other they will hold the flanges 17 and 19 locked to the holder against ready axial displacement. In still other instances these sleeves are parallel and made to such a fit that they will be held in engagement or assembled relation by close frictional contact. In the application of the gasket between a manifold and a cylinder block, where the gaskets are not spaced in the holder to exactly register with the ports, the holder may be adjusted to bring the gaskets into registry with the ports. Thus, if the gaskets are too close together the holder may be stretched or extended; if the gaskets are too far apart, they may be placed in the ports, the gasket holder being contracted or distorted if the gaskets are out of alignment with the ports, the holder may be flexed laterally. When the manifold is secured over said ports, the holder will be compressed and will permanently adjust itself to the new conditions. Also the gaskets may be adjusted to register with faulty spaced ports in cylinder block or manifold.

In the form shown in Fig. 3 the structure is identical with that shown in Figures 1 and 2, except that the holder 11ª is made of screen, such as commonly used for screen doors, or the like. It is manifest that this form of construction can be readily elongated or shortened to fulfill the same purposes as the gasket referred to above.

The modification shown in Fig. 5 is in all respects similar to that shown in the other figures of the drawing, except that it is provided with transverse corrugations 22 that will enhance the stretching or contracting possibilities of the holder 11ᵇ.

Claims:

1. In an article of the class described, the combination of a flexible and manually extensible supporting body, having a pair of holes adapted to substantially fit a pair of gaskets, with a pair of gaskets, said gaskets being fixedly secured to said body at the edges of said holes, and said body being formed of a material manually distortable laterally and longitudinally to locate said holes and gaskets in substantial registration with a pair of portholes.

2. In an article of the class described, the combination of a flexible and manually extensible supporting body formed of wire fabric having its warp and weft extending diagonally relative to the direction of an axis joining a pair of holes formed in said body, with a pair of gaskets adapted to substantially fit said holes, said gaskets being fixedly secured to said body at the edges of said holes, and said body being adapted to be manually distorted laterally and longitudinally to locate said holes and gaskets in substantial registration with a pair of portholes.

3. In an article of the class described, the combination of a flexible and manually extensible supporting body, having a pair of holes adapted to substantially fit a pair of gaskets, with a pair of gaskets, each comprising a pair of telescoping metal members having radially extending flanges in clamping relation with the opposite sides of said body at the edges of said holes, said body being formed of a material manually distortable laterally and longitudinally to locate said holes and gaskets in substantial registration with a pair of portholes.

In testimony whereof I affix my signature at 10 South LaSalle Street, Chicago, Illinois.

JOHN H. VICTOR.